(12) United States Patent
Rondeau et al.

(10) Patent No.: US 7,056,008 B2
(45) Date of Patent: *Jun. 6, 2006

(54) FLUID MIXING SYSTEM

(75) Inventors: Joel Rondeau, Antony (FR); Pierre Vigneaux, Moisenay (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/432,579

(22) PCT Filed: Oct. 4, 2001

(86) PCT No.: PCT/EP01/11483

§ 371 (c)(1),
(2), (4) Date: Nov. 18, 2003

(87) PCT Pub. No.: WO02/44517

PCT Pub. Date: Jun. 6, 2002

(65) Prior Publication Data

US 2004/0100858 A1    May 27, 2004

Related U.S. Application Data

(63) Continuation of application No. 09/726,784, filed on Nov. 29, 2000, now Pat. No. 6,491,421.

(51) Int. Cl.
*B28C 7/04*     (2006.01)
(52) U.S. Cl. ............... 366/8; 366/17; 366/18; 366/136; 366/141; 366/153.1
(58) Field of Classification Search ............ 366/8, 366/17, 18, 136, 141, 152.2, 152.6, 153.1
See application file for complete search history.

(56) References Cited

U.S. PATENT DOCUMENTS

| 3,379,421 | A | * | 4/1968 | Putman ............... 366/18 |
| 4,327,759 | A | * | 5/1982 | Millis ............... 366/152.2 |
| 4,353,482 | A | * | 10/1982 | Tomlinson et al. ...... 366/152.1 |
| 4,397,561 | A | * | 8/1983 | Strong et al. ......... 366/152.5 |
| 4,475,818 | A | * | 10/1984 | Bialkowski ........... 366/152.1 |
| 4,764,019 | A | * | 8/1988 | Kaminski et al. ......... 366/136 |
| 4,779,186 | A | * | 10/1988 | Handke et al. ......... 366/152.2 |
| 4,863,277 | A | * | 9/1989 | Neal et al. .............. 366/137 |
| 4,881,819 | A | * | 11/1989 | Blees ............... 366/152.2 |
| 4,886,367 | A | * | 12/1989 | Bragg et al. ........... 366/137 |
| 4,896,968 | A | * | 1/1990 | Baillie ............... 366/136 |
| 5,018,868 | A | * | 5/1991 | Baillie ............... 366/136 |
| 5,590,976 | A | * | 1/1997 | Kilheffer et al. .......... 366/18 |
| 6,491,421 | B1 | * | 12/2002 | Rondeau et al. ........... 366/8 |
| 6,786,629 | B1 | * | 9/2004 | Rondeau et al. ........... 366/8 |

FOREIGN PATENT DOCUMENTS

| DE | 195 12 416 | * | 4/1995 |
| EP | 0 403 283 | * | 12/1990 |

\* cited by examiner

*Primary Examiner*—Tony G. Soohoo
(74) *Attorney, Agent, or Firm*—Robin Nava

(57) ABSTRACT

A method for continuously mixing a borehole fluid such as cement includes using a measurement of the solid fraction of a cement slurry as it is being mixed to determine the ratio of the solid and liquid components to be added to the slurry. A system for mixing the includes a liquid material (water) supply including a flow meter; a solid material (cement) supply; a mixer which receives the liquid and solid materials and includes an output for delivering materials from the mixer to a delivery system; a device for measuring the amount of material in the mixer, and a flow meter in the output; wherein measurements from the flow meters and the device for measuring the amount of material in the mixer are used to control the amount of solid and/or liquid material added to the mixer.

20 Claims, 3 Drawing Sheets

FLUID MIXING SYSTEM

This is application is a 371 of PCT/EP01/11483 filed Oct. 4, 2001 which is a continuation application of U.S. application Ser. No. 09/726,784 filed Nov. 29, 2000, now U.S. Pat. No. 6,491,421.

FIELD OF INVENTION

The present invention relates to a system for mixing fluids containing solid and liquid materials such as cement. In particular the invention provides a system for the continuous mixing of cements or other fluids used in the drilling, completion or stimulation of boreholes such as oil or gas wells.

BACKGROUND OF THE INVENTION

When a well such as an oil or gas well has been drilled, it is often desired to isolate the various producing zones form each other or from the well itself in order to stabilise the well or prevent fluid communication between the zones or shut off unwanted fluid production such as water. This isolation is typically achieved by installing a tubular casing in the well and filling the annulus between the outside of the casing and the wall of the well (the formation) with cement. The cement is usually placed in the annulus by pumping a slurry of the cement down the casing such that it exits at the bottom of the well and passes back up the outside of the casing to fill the annulus. While it is possible to mix the cement as a batch prior to pumping into the well, it has become desirable to effect continuous mixing of the cement slurry at the surface just prior to pumping into the well. This has been found to provide better control of cement properties and more efficient use of materials.

The cement slurries used in such operations comprise a mixture of dry and liquid materials. The liquid phase is typically water and so is readily available and cheap. The solid materials define the slurry and cement properties when added to the water and mixed, the amount of solid materials in the slurry being important. Since the liquid phase is constant, the amount of solid material added is usually monitored by measuring the density of the slurry and maintaining this at the desired level by controlling the amount of the solid material being added. FIG. 1 shows a schematic diagram of a prior art mixing system. In the system of FIG. 1, mix water is pumped from a feed supply 10 via a pump 12 to a mixer 14 which feeds into a mixing tub 16. The feed supply 10 comprises a pair of displacement tanks 11, 11' each with separate outlets connected to a valve 13 which in turn feeds the pump 12. Two methods are commonly used to determine the amount of water supplied:
1. Proximity switches installed on the shaft of the pump 12 count a number of pulses per rotation. Each pulse corresponds to a displacement volume. This method is sensitive to pump efficiency.
2. Displacement volume is measured by counting the number of tanks pumped down-hole. This measurement method is sensitive to human error in level reading, switching from on tank to another and tank exact capacity. Even more an error in the number of tanks counted can have many consequences (over displacement can result in wet shoe, under displacement can result in no pressure bump or cement left in the casing).

Solid materials are delivered to the mixer 14 from a surge can 18 or directly from a cement silo via a flow control valve 20 and are carried into the mixing tub 16 with the mix water. The contents of the mixing tub 16 are recirculated through a recirculation pipe 22 and pump 24 to the mixer 14. The recirculation pipe 22 also includes a densitometer 26 which provides a measurement of the density of the slurry in the mixing tub 16. An output 28 is provided for slurry to be fed from the mixing tub 16 to further pumps (not shown) for pumping into the well. Control of the slurry mixture is achieved by controlling the density in the mixing tub 16 as provided by the densitometer 26 by addition of solid material so stay at a predetermined level for the slurry desired to be pumped. The densitometer 26 is typically a non-radioactive device such as a Coriolis meter.

While this system is effective for slurries using materials of much higher density than water, it is not effective for slurries using low density solid materials, especially when the density of the solids is close to that of water. In such cases, a density measurement is not sensitive enough to control the amounts of solid material added to the necessary accuracy.

The present invention seeks to provide a mixing system which avoid the problem of density measurement described above.

In its broadest aspect, the present invention comprises using a measurement of the solid fraction of a fluid as it is being mixed to determine the ratio of the solid and liquid components added to the slurry.

The invention is particularly applicable to the mixing of borehole cement slurries, in which case, solids fraction is determined as (slurry vol−water vol)/slurry vol. An alternative but related parameter is porosity, determined as water vol/slurry vol (porosity+solids fraction=1).

A system for mixing cement in accordance with the invention comprises a liquid (water) supply including a device for measuring the amount of liquid supplied; a solid material supply; a mixer which receives the liquid and solid materials and includes an output for delivering materials from the mixer to a delivery system; a device for measuring the amount of material in the mixer; and a flow meter in the output; wherein measurements from the flow meters and the device for measuring the amount of material in the mixer are used to control the amount of solid material added to the mixer.

The flow meters can be mass flow meters or volumetric flow meters. Any suitable form of meter can be used, for example Coriolis meters or electromagnetic meters.

The mixer will typically include a tank or tub, in which case the device for measuring the amount of material in the mixer can be a level sensor. Such a level sensor is preferably a time domain reflectometry- or radar-type device although acoustic or float devices can also be used. It is preferred to mount such a device in an arrangement for damping transient fluctuations in the tank level, for example in an arrangement of concentric slotted tubes. An alternative or additional form of sensor can be a load cell which can be used to indicate the weight of the tank, or a pressure sensor.

The device for measuring the amount of liquid supplied can be a flow meter or a level sensor of the types described above. When the liquid supply includes one or more displacement tanks, a level sensor is preferred Where the mixer includes some form of recirculation of the slurry through the tank, it is important that the output flow meter is downstream of this recirculation.

Where the solid materials comprise cement and other solid additives added separately to the mixer, separate flow meters can also be provided for each separate supply of additives.

In its simplest form, the measurement of solid fraction is used as a guide for the operator to add solids, particularly cement, to the slurry as it is mixed. In more advanced versions, the calculation of solids fraction is used to control the addition of solids directly by means of an automatic control system.

The invention also provides an improved method for calculating displacement volume from a system comprising at least one displacement tank, comprising measuring the level of liquid in the tanks over time and calculating displacement as:

$$\Sigma(V(h1n) - V(h2n))$$

where:
V(h) is the exact volume of the tank at level (h);
h1n is the start level of the n th displaced tank volume; and
h2n is the stop level of the n th displaced tank volume.

BRIEF DESCRIPTION OF THE DRAWINGS

Examples of the present invention will now be described with reference to the accompanying drawing, in which.

DESCRIPTION OF THE PREFERRED EMBODIMENT

Figure 1:
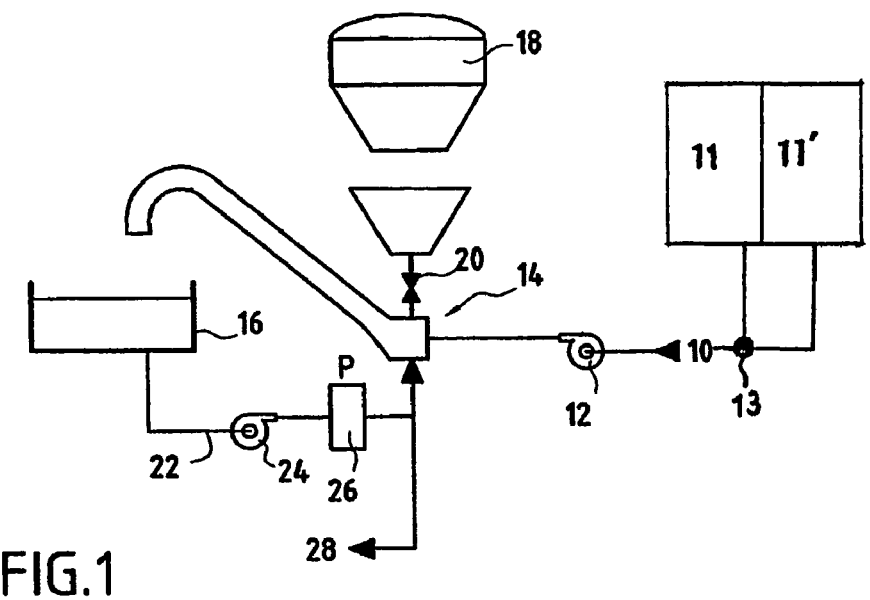
FIG. 1 shows a prior art mixing system.
Figure 2:
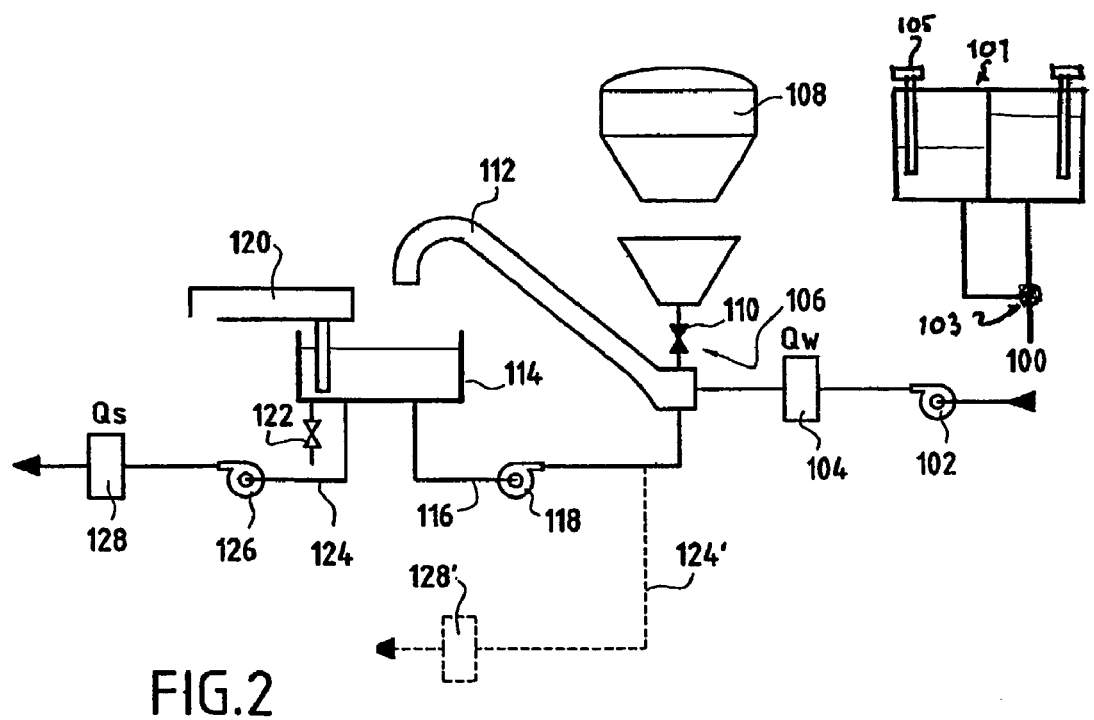
FIG. 2 shows a mixing system according to a first embodiment of the invention.

The system shown in FIG. 2 is used for the continuous mixing of cement for oil well cementing operations and comprises a supply of mix water 100 feeding, via a pump 102 and a flow meter 104 to a mixing system 106.

The supply of mix water comprises a pair of displacement tanks 101, each having a separate output connected to a valve 103 which supplies the pump 102. Level sensors 105 are included in each displacement tank 101 for determining the amount of water supplied to the pump 102. In another version (not shown), the level sensors are omitted. The amount of water supplied is determined in the manner described below.

The mixing system 106 also receives solid materials from a surge can 108 (or alternatively directly from a surge can) which are admitted through a valve 110. The mixed solid and liquid materials are delivered through a feed pipe 112 to a mixing tub 114. The mixing tub 114 has a first outlet 116 connected to a recirculation pump 118 which feeds the slurry drawn from the tub 114 back into the mixing system. The tub 114 is provided with a level sensor 120 and/or a load sensor 122 to provide an indication of the tank contents and any change in contents over time. A second output 124 is provided from the tub 114 which leads, via a second pump 126 and a second flow meter 128 to the pumping system from which it is delivered to the well (not shown). An alternative method of delivery (shown in dashed line in FIG. 2) has an output 124' taken from the recirculation line via a flow meter 128' to the well. Other arrangements are also possible. The pumps 102, 118, 126 are of the usual type found in well cementing systems, for example centrifugal pumps. Likewise, the flow meters 104, 128' are conventional, for example Coriolis meters such as those that have been used as densitometers in previous applications. Different types of pumps and meters each have advantages and disadvantages that are well known in the art and can be selected according to requirements.

Figure 3:
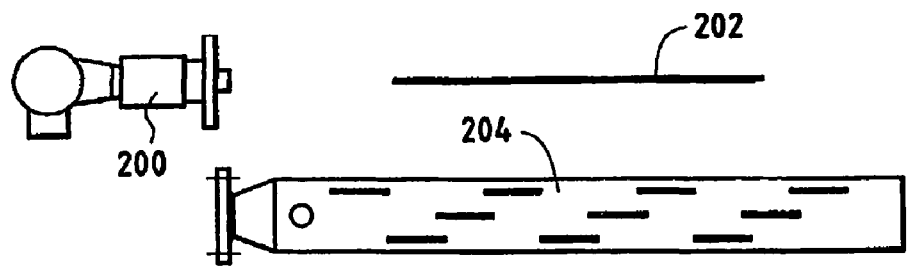
FIG. 3 shows the components of a tank level sensor.
Figure 3:
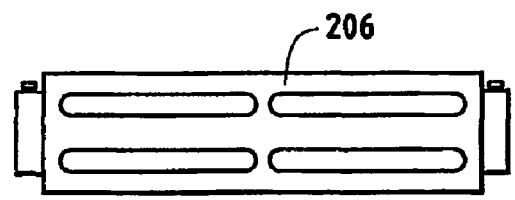
Figure 4:
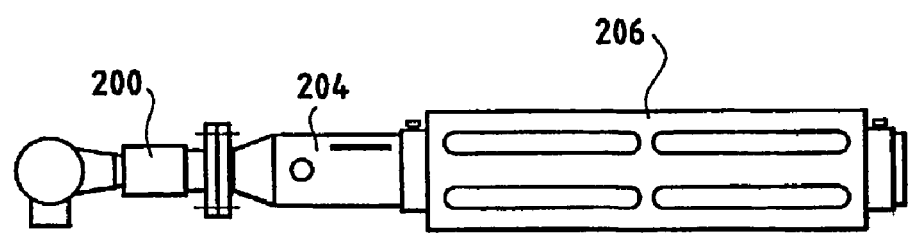
FIG. 4 shows the components of the level sensor assembled.
Figure 5:
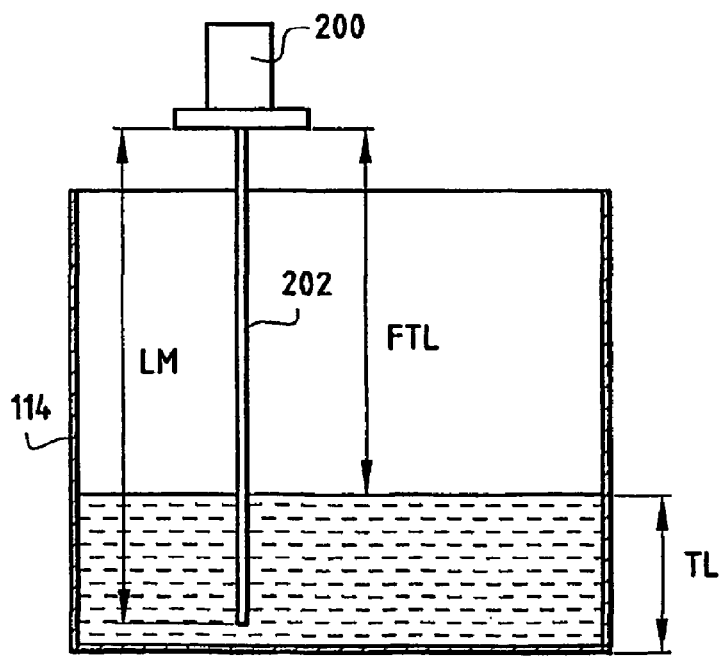
FIG. 5 shows a schematic of the tank level measurement.

FIGS. 3–5 show details of the level sensors used in the displacement tanks and tub and the manner of installation. The sensor comprises a Krohne radar sensor 200, a stainless steel rod 202, an inner slotted sleeve 204 and an outer slotted sleeve 206. The rod 202 is screwed onto the sensor 200 and the inner sleeve 204 mounted over the rod 202 and attached to a flange on the sensor 200. The outer sleeve 206 is mounted over the inner sleeve 204 to which it is attached.

For use in the displacement tanks, each displacement tank receives a level sensor. This sensor gives an accurate measurement of the liquid level in the tank. The exact volume versus level is required to calculate the displaced volume. In case the tank cross section profile is not accurately known a so-called tank calibration is performed. A water meter equipped with a digital output measures the exact displacement tank volume versus tank level. This operation is performed only once for each tank. To supply water to the system, the valve 103 is operated to allow water to flow from one or other tank to the pump 102. When a tank discharge valve is opened, a device such as an end switch, pressure switched or any other appropriate device is used to begin calculation of the displacement volume. Displacement volume is then computed as:

$$\Sigma(V(h1n) - V(h2n))$$

Where:
V(h) is the exact volume of the tank at level (h)
h1n start level of the n th displaced tank volume
h2n stop level of the n th displaced tank volume When the level in the tank in use becomes low, the supply is switched to the other tank. Switching operation from one tank to another can either be manual or automated and when one tank is emptying the other one is filled up for further use. Since the level sensors can be used to give an instantaneous measurement of the amount of water provided to the system, it is possible to confirm the data provided by the flow meter 104, or even to replace the need for this flow meter completely. When the flow meter is present, it is not essential to have the level sensors in the displacement tanks.

This method of determining the displacement volume can be applied to other forms of cementing operation than the ones described here, and has the advantage that it is relatively insensitive to pump efficiency or operator error as found in the previous systems.

For use in the mixing tub, the sensor arrangement is installed in the mixing tub 114 in the vertical position and in a location where the slurry is renewed as the mixing occurs, to avoid location in a dead zone where cement might set. The sensor provides a measurement of the difference between the length of the rod 202 (LM) and the level of slurry in the tub level (TL). The free tub level (FTL) is obtained by:

$$FTL = LM - TL.$$

It will be appreciated that the exact form of level sensor is not important to the overall effect of the invention. What is important is to obtain an indication of the variation versus time of the tub slurry volume (called "tub flow" in this document). This can be obtained using a float or a load sensor or combinations of any of these or any other sensor giving this information.

The outputs of the flow sensors and level sensors are used to monitor the solid fraction of the slurry in the following manner:

The solid fraction computation is based on the balance between incoming and outgoing volumes (or flow rates) as expressed in the following relationship:

$$Q_{water} + Q_{cement} = Q_{slurry} + Q_{tub}$$

where $Q_{tub}$ is the tub rate.

Tub rate is the variation versus time of the tub volume and is considered as positive while the tub level increases and negative while it decreases. The smaller the tub cross section, the more sensitive the measurement will be to change. $Q_{tub}$ is given by:

$$Q_{tub} = S_{tub} \frac{dh_{tub}}{dt}$$

where $S_{tub}$ is the tub cross section and $$\frac{dh_{tub}}{dt}$$

is the tub level variation over time. In the simplest case, the tub section is constant and the tub rate becomes the product of the tub level variation/time and the tub cross section.

The solids fraction at time t is computed as the ratio of (slurry vol–water vol) over the total slurry volume present at time t in the tub. The variation in tub slurry volume $V_{tub}(t+\delta t) - V_{tub}(t)$ can be expressed as:

$$V_{tub}(t+\delta t) - V_{tub}(t) = [Q_{water}(t) + Q_{cement}(t) - Q_{slurry}(t)] * \delta t$$

which can be rewritten as:

$$V_{tub}(t+\delta t) - V_{tub}(t) = Q_{tub}(t) * \delta t.$$

In the same way, the variation in the water volume present in the tub at time t $V_{water}(t+\delta t) - V_{water}(t)$ is equal to the incoming water volume minus the amount of water present in the slurry leaving the tub, and can be expressed as:

$$V_{water}(t+\delta t) - V_{water}(t) = [Q_{water}(t) - (1 - \text{SolidFraction}(t)) * Q_{slurry}(t)] * \delta t.$$

Solid Fraction is then expressed as:

$$\text{SolidFraction}(t+\delta t) = 1 - \frac{V_{water}(t) + [Q_{water}(t) - (1 - \text{SolidFraction}(t)) * Q_{slurry}(t)] * \delta t}{V_{tub}(t) + Q_{tub}(t) * \delta t}$$

The calculation requires that the initial conditions be known if it is to be accurate tab initio, i.e. is the tub empty, full of water or containing slurry already. The calculation will ultimately stabilise independently of the initial conditions, the time taken to do this depending on the tub volume and the output flow rate $Q_{slurry}$.

These calculations are conveniently performed using a computer, in which case the measurements can be provided directly from the sensors via a suitable interface. A preferred screen display will show the various flow rates or levels, together with the desired solids fraction (calculated when designing the slurry). The mixing process is controlled by adjusting the amount of cement and/or water added to the mixer so as to maintain the calculated solids fraction at the desired level. Alternatively, the results of the calculations can be fed to an automatic control system which adjusts the rate at which the components are delivered to the mixing system.

Figure 6:
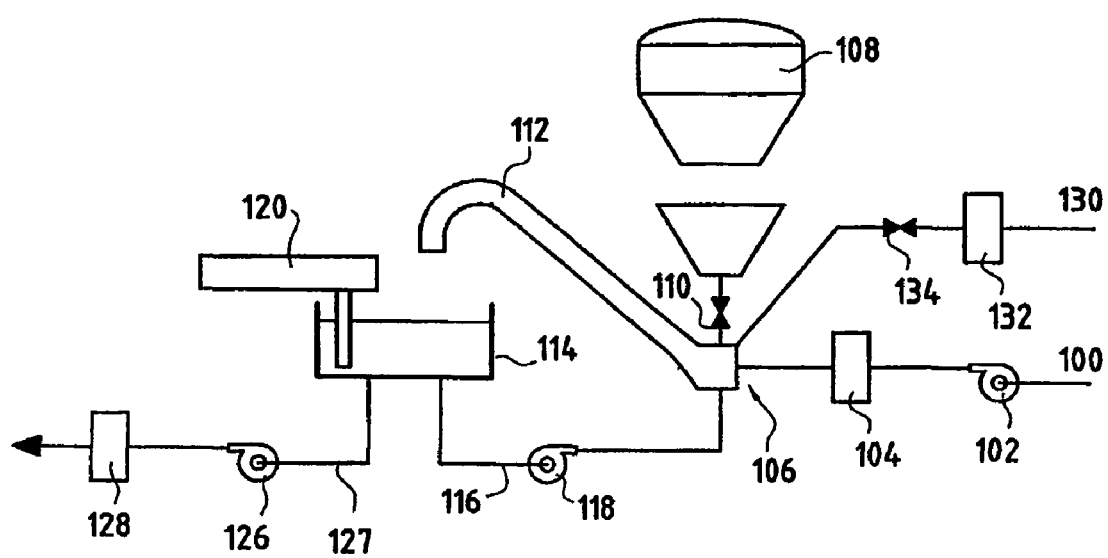
FIG. 6 shows a mixing system according to a second embodiment of the invention.

The system described above works well when the dry ingredients (blend of cement+additives) are delivered pre-mixed to the well site from another location. In this case essentially the same measurements and calculations as described above are performed, merely substituting $Q_{blend}$ for $Q_{cement}$. If it is desired to mix the dry materials on site as part of the continuous mixing process, a slightly different approach is required. FIG. 6 shows a mixing system according to another embodiment of the invention and uses a numbering scheme which follows that of FIG. 2. The system of FIG. 6 comprises an additional dry material supply 130 which admits the dry products to the mixing system 106 via a mass flow meter 132 (other flow measurement means can also be used) and a control valve 134. In this case, the basic control equation becomes:

$$Q_{water} + Q_{additive} + Q_{cement} = Q_{tub} + Q_{slurry}$$

where four of the five variables are know and $Q_{cement}$ is the most difficult parameter to measure accurately. Where multiple dry additives are to be added, the supply can comprise separate material supplies, each with a flow meter and valve. Additional terms $Q_{additive1}$, $Q_{additive2}$, etc., are included in the control equation.

It will be appreciated that changes can be made in implementation while still remaining within the scope of using solid fraction as the property monitored to effect control of the mixing.

For example, the method can be applied to the mixing of other borehole fluids such as stimulation fluids (fracturing fluids or even drilling fluids (mud). In the case of fracturing fluids, the gel and proppant (liquid and solid phases) are usually mixed using a pod blender and the proportion of gel and proppant controlled using a densitometer (usually radioactive) downstream of the mixer/blender. The use of radioactive sensors generates many environmental issues and while Coriolis-type meters are an alternative, they are know to have limitations in respect of flow rate when used this way. The present invention allows control of proppant and gel concentrations by means of flow meters without the need to rely on densitometer measurements.

Gel and mixed fluid flow rates are measured by means of electromagnetic flow meters. The amount of proppant is directly deduced from the following relationship:

$$Q_{gel} + Q_{Proppant} = Q_{MixedFluid}$$

Proppant concentration (in Pounds Per Gallon Added or "PPA") can be a function of solid fraction as defined above and expressed as the following:

$$PPA = \text{Proppant Density} * \text{Solid Fraction}/(1 - \text{Solid Fraction}).$$

Thus the solid fraction measurement methodology described above in relation to cement can be applied to fracturing fluids by determining proppant density rather than cement density.

This approach has the advantage of not requiring the use of radioactive densitometers thus avoiding limitations placed on use for regulatory reasons and without the flow rate performance limitations of other measurement techniques. The equipment and control system is essentially the same as that used in the cementing system described above.

The invention claimed is:

1. A system for mixing a cement slurry comprising:
   i) a liquid material supply (101) including a device (104) for measuring the amount of liquid material supplied;
   ii) a solid cement supply (108);
   iii) a mixer including a tub (114) which receives the liquid and solid cement and includes an output (124) for delivering materials from the mixer to a delivery system;
   iv) a flow meter (128) in the output (124); and
   v) a computing device,
wherein:
   the system further comprises a device (120) for measuring the amount of material in the mixer;
   the computing device receives the output from the device (120) for measuring the amount of material in the mixer and from the flow meter (104) and is arranged to calculate the variation in the amount of material in the tub (114) over time, and the solid fraction of the mixture; and
   the calculated solid fraction is used to control the relative amounts of solid and liquid material added to the mixer.

2. A system as claimed in claim 1, wherein the flow meter is selected from mass flow meters and volumetric flow meters.

3. A system as claimed in claim 1, wherein the flow meter is selected from Coriolis meter and electromagnetic meter.

4. A system as claimed in claim 1, wherein the mixer comprises a mixing section and the tub, mixed materials being fed from the mixing section to the mixing tub, and a portion of the materials in the tub being recirculated to the mixing section.

5. A system as claimed in claim 4, wherein the device comprises a level sensor in the tub.

6. A system as claimed in claim 4, wherein the device comprises a load sensor which measures the weight of the tub.

7. A system as claimed in claim 4, wherein recirculation of material takes place upstream of the flow meter in the output.

8. A system as claimed in claim 1, comprising separate supplies of cement and dry additives, a flow meter being provided to measure the rate of flow of the dry additives.

9. A system as claimed in claim 8, wherein the supply of dry additives comprises multiple separate supplies of additives, each with its own flow meter.

10. A system as claimed in any preceding claim, includes at least one tank.

11. A system as claimed in claim 10, further comprising a level sensor in the tank or a flow meter which measures the amount of liquid flowing from the tank.

12. A method of mixing a cement slurry, wherein the cement and liquid components are continuously delivered to a mixer and the cement slurry is continuously removed from the mixer for use, the method comprising:
   i) measuring the flow rate of liquid components added to the mixer; and
   ii) measuring the flow rate of slurry removed from the mixer;
wherein:
   iii) measuring the amount of slurry in the mixer;
   iv) using a measurement of flow rate and amount of slurry to calculate the solid fraction of the fluid; and
   (v) controlling the delivery of cement and/or liquid components to the mixer according to the calculated solid fraction.

13. A method as claimed in claim 12, wherein additives are delivered to the mixer separately from cement, the method further comprising measuring the flow rate of the additives delivered to the mixer.

14. A method as claimed in claim 12 wherein the mixer includes a tub, the measurement of the amount of slurry in the mixer comprising a measurement of the amount of slurry in the tub.

15. A method as claimed in claim 14, wherein a portion of the slurry in the tub is recirculated into the mixer as solid and liquid components are added.

16. A method as claimed in claim 15, wherein the recirculation takes place upstream of the measurement of the flow rate of slurry removed from the mixer.

17. A method as claimed in any of claims 12–16, wherein liquid components are delivered for mixing from a liquid supply including at least one tank, the method further including the steps of measuring the level of liquid in the tank over time and computing displacement volume as:

$$\Sigma(V(h1n)-V(h2n))$$

where:
   V(h) is the exact volume of the tank at level (h)
   h1n is the start level of the n th displaced tank volume; and
   h2n is the stop level of the n th displaced tank volume.

18. A method as claimed in claim 12, wherein the step of using a measurement of the flow rate and amount of slurry to calculate the solid fraction of the fluid comprises calculating porosity, porosity being determined as water volume/slurry volume, and solid fraction being equal to one minus porosity.

19. A method as claimed in claim 12, wherein the step of using a measurement of flow rate is a step of using the measurement of the flow rate of the liquid components added to the mixer.

20. A method as claimed in claim 14, wherein the step of measuring the amount of slurry in the mixer comprises using a level sensor to measure the level of slurry in the tub.

* * * * *